United States Patent Office 3,352,977
Patented Nov. 14, 1967

3,352,977
HELICAL SCAN TRANSDUCER APPARATUS UTILIZING TIME SHARING HEAD TO MINIMIZE DISTORTION DURING EDGE CHANGEOVER
Fred E. Shashoua, Cherry Hill, N.J., assignor to Radio Corporation of America, a corporation of Delaware
Continuation of application Ser. No. 272,755, Apr. 12, 1963. This application Feb. 15, 1967, Ser. No. 616,413
22 Claims. (Cl. 179—100.2)

ABSTRACT OF THE DISCLOSURE

A helical scan transducer system is provided including at least two record-reproduce devices. A first signal to be recorded is coupled to one of the two devices. A further signal composed of only the intervals occurring in the first signal as the one device passes in turn from one edge of the record medium to the other to scan along successive tracks extending diagonally across the medium is recorded by the other device. Where a plural signal recorder is used, an additional record-reproduce device is time shared between the plural signals to record a further signal composed only of the intervals occurring in each of the plurality of signals as the respective record-reproduce devices to which the plural signals are fed pass in turn from one edge of the record medium to the other to scan along successive tracks extending diagonally across the medium. Upon reproduction, the further signal is combined with the reproduced first signal or plurality of signals to produce a continuous output signal or signals in which no deterioration or gaps are introduced by the scanning of the reproduce devices across the edges of the medium.

---

This is a continuation of my application, Ser. No. 272,755, filed Apr. 12, 1963, and now abandoned.

This invention relates to helical scan recording and reproducing systems, and, particularly, to an improved helical scan system for recording and reproducing a plurality of different, continuous signals with a minimum amount of distortion being introduced in the signals by the operation of the helical scanner in scanning separate, successive record tracks on the record medium.

Various signal recording and reproducing systems are known in which a magnetic tape or other record medium is made to describe a helical path around the periphery of a structure usually of cylindrical construction and including signal recording-reproducing devices. Such systems are referred to as helical scan recording systems and in certain applications as slant track recording systems. The tape may completely encircle the structure in a closed loop so that a tape helix of 360° or more is developed. Alternatively, an open loop is also used with the tape describing a helical path around only a portion of the periphery of the structure. By way of example, tape helices of approximately 270°, 180°, or 90° can be formed in this manner.

The signal recording-reproducing devices, which may be magnetic heads spaced about the periphery of the cylindrical structure, for example, are each made to rotate at constant speed and in a fixed plane at right angles to the longitudinal axis of the structure around which the tape is driven. Because of the tape helix, a helix angle or angle-of-scan exists between the rotating signal recording-reproducing devices and the direction of tape travel. The angle is governed by the width of the tape and by the diameter of the structure supporting the tape helix. Each signal recording-reproducing device will scan diagonally across the width of the tape. By a proper choice of such factors as the number and spacing of the recording devices used, the tape helix angle, tape speed and the rotating speed of the signal recording-reproducing devices, the signal recording-reproducing devices can be made to scan at a desired angle diagonally from one edge of the tape to the other or over only a given portion of the tape width, for example, one-half the width of the tape. Different electrical signals fed individually to the recording-reproducing devices are each recorded on, and can be reproduced from, a succession of parallel, equal-length tracks extending at the same angle across the tape width.

In applications where the tape is wrapped completely around the supporting structure to form a closed loop tape helix of 360° or more with opposite edges of the tape abutting one another as the tape enters and leaves the helical path, each of the signal recording-reproducing devices upon completing one scan across the tape passes over the abutting edges of the tape and begins a second scan across the tape. In reproducing the signals from the record tracks, a deterioration in the reproduced signals takes place as each signal recording-reproducing device, in turn, passes from one edge of the tape to the other due to the sensing by the device of the discontinuity in the tape surface. In other applications, a different tape helix may be used so that the opposite edges of the tape do not abut one another but rather are spaced some distance apart. The tape may be formed in a closed loop of 360° or in an open loop of less than 360°. In such applications, the signal recording-reproducing devices scan in turn across an open space after completing one scan and before starting the next. A deterioration or possible total loss of the signals occurs upon reproduction during the period in which the signal recording-reproducing devices pass from one edge of the tape to the other.

Where synchronous signals are to be recorded, the helical scan system can be designed so that upon reproduction of the recorded signals each signal recording-reproducing device passes from one tape edge to the other during the time of the control or sync period in the synchronous signal. The tape edges may abut or may be spaced apart. The deterioration or total loss of the reproduced signal occurring during the control period can be corrected in most applications during sync removal and reinsertion procedures commonly employed to clean-up the reproduced signal before application to a utilization circuit. Since the deterioration or total loss of the reproduced signal is timed to occur outside of the message portion, there is little adverse effect on the message content. However, the need to reform the sync or control period adds to the complexity of the recording and reproducing system and can require circuitry which is difficult and often impractical to implement.

In recording and reproducing a non-synchronous signal, no such convenient blanking or control period exists. Such a signal exhibits a continuous and unbroken message content. Where a tape helix is used in which the tape edges abut, the deterioration in the reproduced signals introduced as the signal recording-reproducing devices pass from one tape edge to the other seriously distorts and otherwise renders the reproduced signals difficult to process. It is possible to blank the reproduced signals during the period in which the deterioration occurs. In addition to the problems arising from the introduction of gaps in the reproduced signals, there is a certain loss of message content which is particularly undesirable where certain types of coding are used to convey the massage.

In applications where the edges of the tape do not abut, an irretrievable loss of the message content of the non-synchronous signals occurs upon recording during the interval in which the signal recording-reproducing devices leave one edge of the tape and contact the other edge of the tape. Such a loss of message content is unacceptable in a practical signal recording and reproducing system.

It is an object of the invention to provide an improved multichannel helical scan recorder-reproducer.

Another object is to provide an improved helical scan system for recording and reproducing a plurality of continuous signals.

A further object is to provide an improved system of the type which records a plurality of different, continuous signals on a succession of tracks extending diagonally across a record medium and reproduces the signals with minimum distortion introduced therein due to the signals being reproduced from separate, successive record tracks.

A still further object is to provide an improved multichannel helical scan system for recording and reproducing a plurality of different signals having continuous message content without introducing gaps or other distortion in the message content of the reproduced signals due to the operation of the helical scanner in completing successive scans across the record medium.

A still further object of the invention is to provide an improved helical scan system for recording and reproducing a plurality of continuous signals while using either a closed loop tape helix or an open loop tape helix.

In accordance with the invention, a helical scan system is provided including a plurality of signal recording-reproducing devices arranged to scan in turn over a succession of tracks extending diagonally across the width of a record medium. All but one of the signal recording-reproducing devices operate to record and reproduce a continuous signal with a different continuous signal being processed by each of the devices. The remaining signal recording and reproducing device is time shared between the different continuous signals. The time shared device is spaced from the other devices so that it is in contact with the tape when each of the other devices pass from one tape edge to the other to begin a new scan.

In the record mode, as each device to which a continuous signal is applied passes from one tape edge to the other, the portion of the continuous signal occurring during that period is recorded by the time shared device. The time shared device records for each complete cycle of the helical scanner one additional track including portions of each of the continuous signals fed to the other devices. In the reproduce mode, each signal is derived from the signal recording and reproducing device assigned to that channel, except that during the edge crossover of the device the signal is derived from the time shared device. In this manner, continuity of all the continuous signals is maintained while at the same time avoiding any deterioration or loss of signal which would otherwise occur as the signal recording and reproducing devices pass in turn from one tape edge to the other. One additional track is used to maintain the continuity of the plurality of different, continuous signals.

A more complete description of the invention will now be given in connection with the accompanying drawing, in which.

In describing the invention, reference will be made to a magnetic tape, helical scan recording and reproducing system. The invention is not limited to use in such an application. It can be adapted for use in a wide range of applications using various types of record mediums and signal recording and reproducing devices. For example, instead of employing magnetic heads arranged to record and reproduce signals from a magnetic tape, a suitable form of writing styli may be used with an appropriate record medium. In a further example, light recording and reproducing techniques can be used.

Figures 1A, 2:
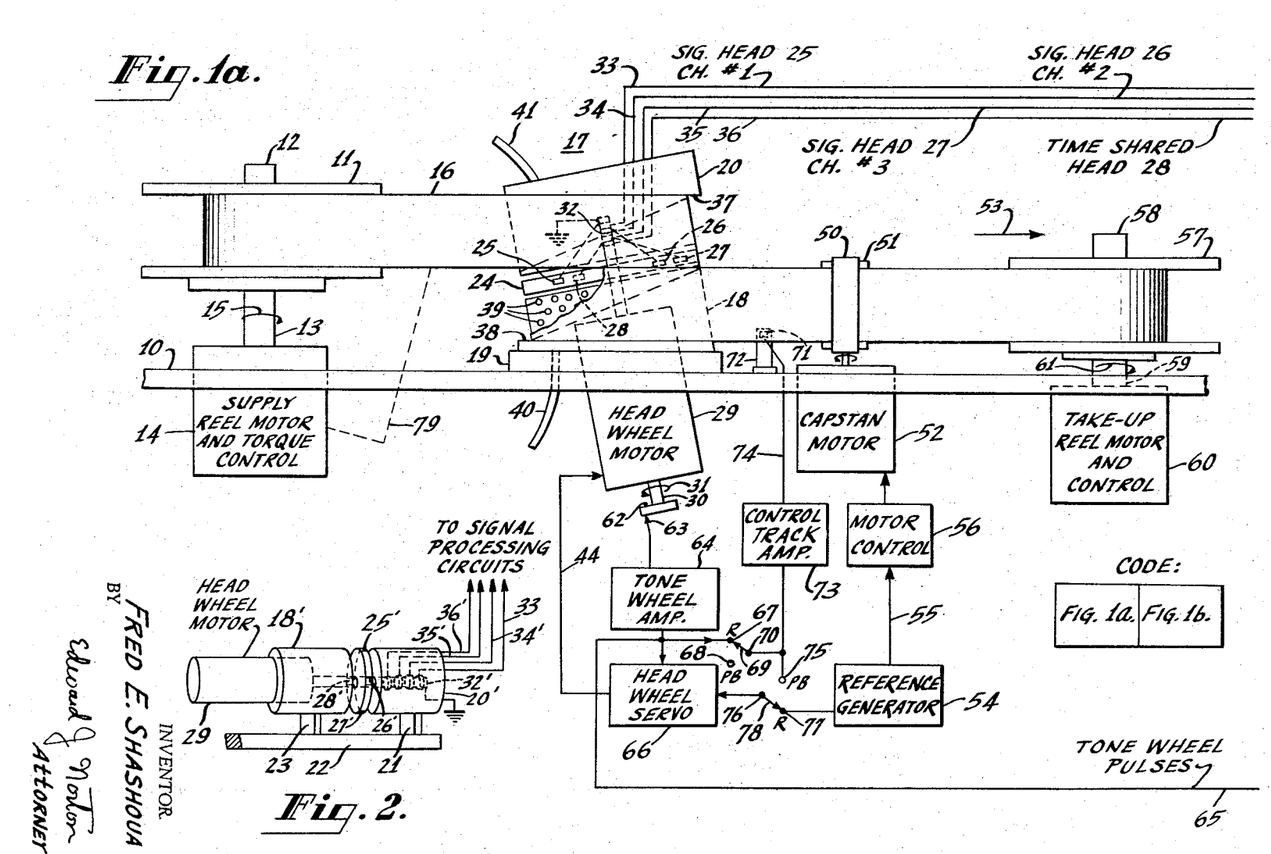
FIGS. 1a and 1b taken together is partly a plan view and partly a block diagram of one embodiment of a multichannel helical scan system constructed according to the invention.
FIG. 2 is a simplified plan view of the helical scan magnetic head assembly shown in FIG. 1.
Figure 1B:
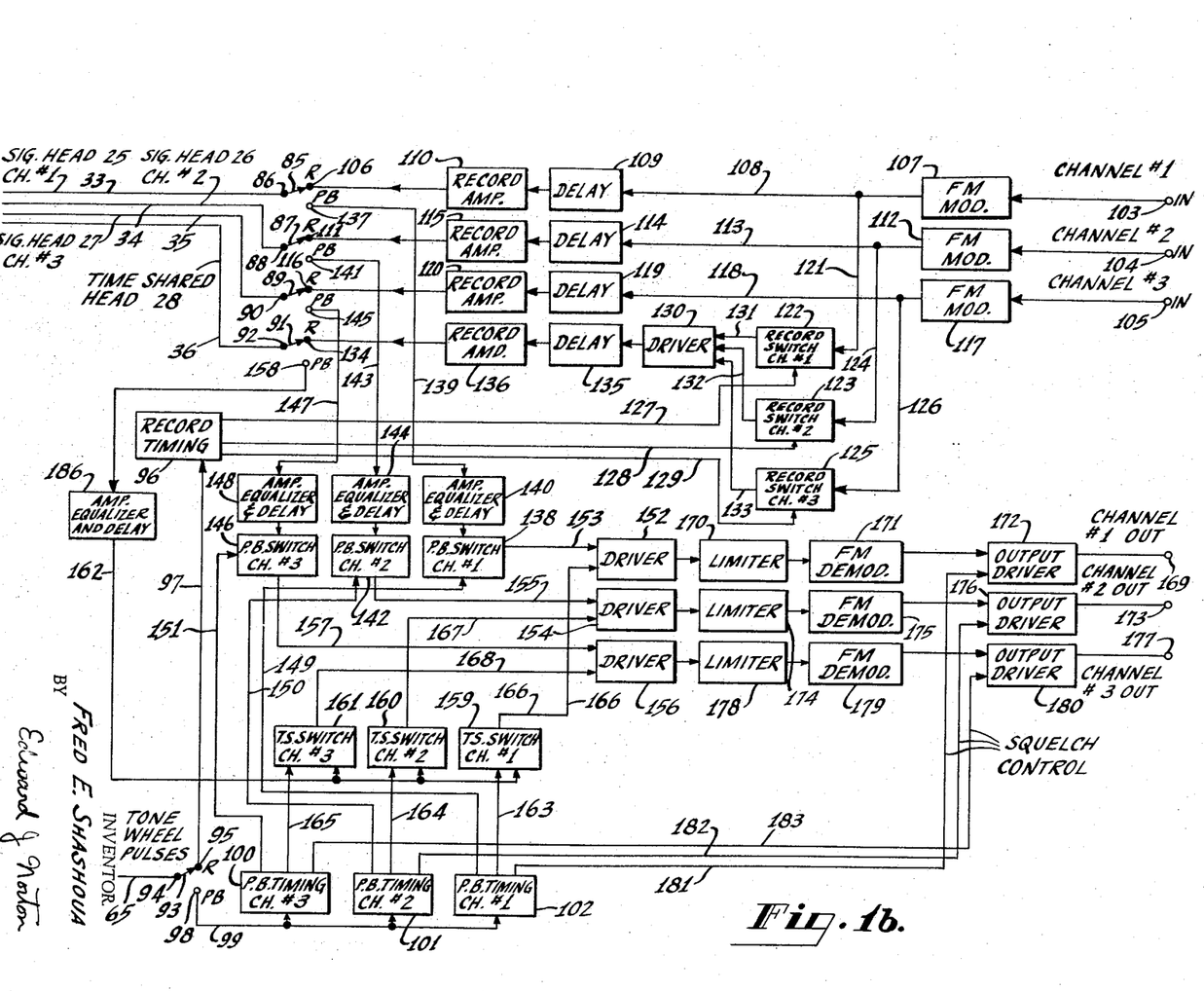

FIGS. 1a and 1b taken together according to the code shown in the drawing presents by way of example a magnetic tape, helical scan recorder-reproducer for processing three different, continuous signals. A full or closed loop tape helix of greater than 360° is formed. As the description proceeds, various dimensions, frequencies, speeds and values will be given. This information is presented to assist in an understanding of the invention. The invention is not limited to use in a system using the particular circuit and equipment parameters given, since this information is and can be determined according to the needs of a particular application. It will be assumed that the signal recording and reproducing system to be described is designed to use a type of frequency modulation recording with a 4 megacyle (mc.) bandwidth capability.

In order to avoid unnecessary confusion in the drawing, all around symbols and common return paths are omitted in FIGS. 1a and 1b. It is understood that such ground connections will be provided in the customary manner.

A panel or similar supporting structure 10 is shown in FIG. 1a. A magnetic tape supply reel 11 is secured by a suitable locking member 12 to a driving shaft 13. A motor 14 applies torque to the supply reel 11 via shaft 13 in the direction opposite to that shown by the arrow 15. The supply reel 11 is forced to rotate in the direction of the arrow 15 through the action of the capstan assembly 50, 51, 52 described below. The motor 14 is mounted on the panel 10 by any suitable mechanical means. A length of magnetic tape 16 is wound on the supply reel 11. The tape 16 is, for example, two inches wide and comprises a Mylar or other plastic backing coated by magnetic oxide particles.

The tape 16 travels from the supply reel 11 to, completely around and away from a helically machined mandrel, indicated generally as 17, with the edges of the tape 16 abutting one another in the area where the tape 16 begins and completes its travel about the mandrel 17. A simplified view of the construction of the mandrel 17 is given in FIG. 2. Elements in FIG. 2 are given the same reference numbers as the corresponding elements in FIG. 1a with the similar elements in FIG. 2 being primed. The mandrel 17 includes a first stationary, hollow, cylindrical member 18. As shown in FIG. 1a, the member 18 is secured to the panel 10 by a mounting plate 19. The mandrel 17 also includes a second stationary, hollow, cylindrical member 20. The member 20 is secured to the panel 10 and to the first member 18 by a supporting brace structure 21, 22, 23 shown in FIG. 2 but not visible in the view of FIG. 1a. Such structure would be included in FIG. 1a on the side of the mandrel 17 opposite to that shown as exposed to the viewer. The two cylindrical members 18 and 20 are of similar diameter and are spaced apart so that a uniform gap or spacing exists therebetween. A rotatable disc or wheel 24 is positioned in the gap between the two members 18 and 20. The wheel 24 has a flat cylindrical surface substantially even with the surface of the cylindrical members 18 and 20.

Figure 3:
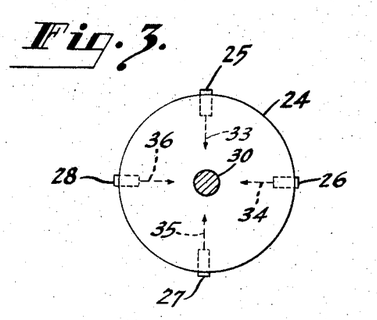
FIG. 3 is a side view and FIG. 4 is an end view of a magnetic head wheel suitable for use in the embodiment of the invention shown in FIG. 1.
Figure 4:
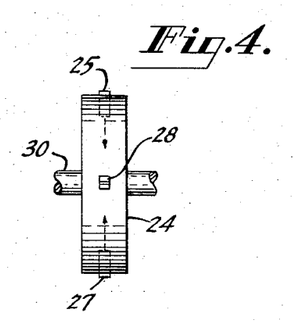

FIG. 3 is a side view and FIG. 4 is an end view of the wheel 24. Four magnetic heads 25, 26, 27 and 28 are spaced approximately 90° apart about the periphery of the wheel 24. A section of the tape 16 in FIG. 1a is cut away to show one of the magnetic heads 25, the other magnetic heads 26, 27 and 28 being shown in FIG. 1a by dotted lines. The magnetic heads 25, 26, 27 and 28 are raised above the cylindrical surface of the wheel 24 so that they make firm contact with the tape 16. By way of example, the diameter of the magnetic head wheel 24 may be approximately 8 inches. The tape 16 wraps around the helical mandrel 17 for approximately 370° and typically presents a 55 mil. tape surface in cylindrical form to the magnetic heads 25, 26, 27 and 28.

A head wheel motor 29 secured to the panel 10 by suitable mechanical means serves to rotate the head wheel 24 via a shaft 30 in the direction of the arrow 31. While the head wheel 24 is shown as being driven in a direction opposite to the direction of tape travel, the head wheel 24 may be driven in certain applications in the direction of tape travel. Since the rotation direction of the head wheel 24 determines the direction in which the record tracks are diagonally placed on the tape 16, from right-to-left or from left-to-right with respect to the direction of tape travel, it is necessary that the head wheel 24 be rotated in the same direction during recording and reproduction. The head wheel motor 29 drives the head wheel 24, for example, at 60 revolutions per second.

As shown in FIGS. 3 and 4, the magnetic heads 25, 26, 27 and 28 are aligned so that they all rotate through the same fixed plane. The head wheel 24 is inclined at an angle with respect to the edge of the tape 16. The angle between the plane through which the head wheel 24 rotates and the edge of the tape 16, defined as the helix angle, is in the example given approximately 4° and 36 minutes. The magnetic heads 25, 26, 27 and 28 all scan from left-to-right diagonally across the tape 16 at the same helix angle.

Signal currents are fed to and from the magnetic heads 25, 26, 27 and 28 by means of a suitable device represented in FIGS. 1a and 2 as slip rings 32, 32'. A first electrical signal is fed to and derived from the first magnetic head 25 via the slip rings 32 and a lead 33. A second electrical signal is fed to and derived from the second magnetic head 26 spaced 90° from the first head 25 on the head wheel 24 via the slip rings 32 and lead 34. A third electrical signal is fed to and derived from the third magnetic head 27 spaced 90° from the second head 26 via slip rings 32 and lead 35. The fourth magnetic head 28 spaced 90° from the third magnetic head 27 is designated as the time shared head with a signal produced in the manner described below being fed to and derived from the magnetic head 28 via slip rings 32 and lead 36.

As may be seen in FIG. 1a, the cylindrical member 20 preferably includes a recessed edge portion 37 for guiding the tape 16 onto the mandrel 17. The cylindrical member 18 includes a recessed edge portion 38 for guiding the tape 16 away from the mandrel 17. A plurality of holes 39 are arranged in the surface of the member 18. A plurality of holes, not shown, are arranged similarly in the surface of the member 20. The two cylindrical members 18 and 20 are of a double-wall construction. Pressurized air is fed through the holes 39 in the surface of member 18 and the holes in the surface of member 20 via suitable connections on the two members 18, 20 and tubes 40 and 41, respectively, which are connected to an air pump, not shown. In this way, a hydrostatic air lubrication of the tape 16 on the helix mandrel 17 is provided. In addition to providing a control over the tape diameter, this lubrication reduces drag friction between the tape 16 and the mandrel 17. Tape wear is reduced, since the rotating heads 25, 26, 27 and 28 are the only elements that contact the surface of the tape 16. The hydrostatic air lubrication in the surface areas of the two members 18, 20 is supplemented by hydrodynamic lubrication provided by the flat surface area on the circumference of the head wheel 24.

The tape 16 after leaving the mandrel 17 passes between a capstan 50 and pressure roller 51. A capstan motor 52 drives the capstan 50 which in turn drives the tape 16 in the direction of the arrow 53. The speed of the capstan motor 52 is controlled by a reference signal fed to the capstan motor 52 from a reference generator 54 via lead 55 and a motor control 56. By way of example, the capstan motor 52 may be continually run at a speed of 600 revolutions per minute, with the size of the capstan 50 being determined so that a tape speed results of 7 and one-half inches per second for each magnetic head on the head wheel 24 or 30 inches per second for the entire head wheel. A head-to-tape velocity of approximately 1500 inches per second is provided which is sufficient to allow the 4 mc. bandwidth capability for the recorder-reproducer. A take-up reel 57 locked by member 58 to a shaft 59 driven by motor 60 in the direction of the arrow 61 receives the tape 16. The take-up reel motor 60 and the capstan motor 52 are both secured to the panel 10 by suitable mechanical means.

A tone-wheel 62 is mounted on and driven by the shaft 30 of the head wheel motor 29. The tone wheel 62 can be constructed in any known manner and can include, for example, a single insert of magnetic susceptible material on its peripheral surface. A magnetic induction pick-up means 63 functions to generate a pulse for each revolution of the tone wheel 62. Assuming that the motor 29 is operating at 60 revolutions per second, pick-up means 63 generates a pulse train of 60 pulses per second. Since the pick-up means 63 generates a pulse at the same point in each revolution of the head wheel 24, the resulting pulse train has a frequency and phase determined by the velocity and timing of the head wheel 24. The pulse train produced by the pick-up means 63 and tone wheel 62 is fed to a tone wheel amplifier 64. The output pulse train of the amplifier 64 is fed over a first lead 65 to the signal processing circuit shown in FIG. 1b and described below. The output pulse train of the amplifier 64 is also fed to a head wheel servo 66 and to the record contact 67 of a manual switch 70. The switch 70 also includes an open playback contact 68 and a wiper arm 69. The output of the head wheel servo 66 is fed to the head wheel motor 29 over lead 44.

A control magnetic head 71 is positioned adjacent one edge of the tape 16 between the mandrel 17 and the capstan 50. The control head 71 is arranged to scan a longitudinal track extending along the edge of tape 16. The control head 71 is supported by an arm-like member 72 mounted on the panel 10. The control head 71 is connected by an amplifier 73 and lead 74 to the wiper arm 69 of switch 70 and to the playback contact 75 of a manual switch 76. Switch 76 also includes a record contact 77 connected to an output of the reference generator 54 and a wiper arm 78 connected to an input of the head wheel servo 66.

As the tape 16 is pulled by capstan 50 over the mandrel 17 between the supply reel 11 and the take-up reel 57, the tension on the tape 16 is monitored by suitable control means such as a mechanical arm, for example, represented in FIG. 1a by the dotted line 79. The control means 79 generates a control signal from the tape tension which determines the torque provided by the motor 14 on the supply reel 11 so that the proper tension is maintained on the tape 16. While not shown in order to simplify the drawings, tape guides and other elements commonly used to guide and control the tape 16 in its passage over the tape path can be used in the customary manner.

The discussion up to this point has been directed primarily to the mechanical layout of the helical scan recording and reproducing system. The parts of the system shown in FIG. 1a including the mandrel 17 and capstan 50 are not drawn to scale but rather are arranged only to indicate the relation of the parts to one another along the tape path. The signal processing circuitry shown in FIG. 1b by which a plurality of signals are fed to and derived from the magnetic heads 25, 26, 27 and 28 on head wheel 24 will now be described.

The first channel signal magnetic head 25 is connected via slip rings 32 and lead 33 to the wiper arm 85 of a manual switch 86. The second channel signal magnetic head 26 is connected via slip rings 32 and lead 34 to the wiper arm 87 of a manual switch 88. The third channel signal magnetic head 27 is conencted via slip rings 32 and lead 35 to the wiper arm 89 of a manual switch 90, and the time shared magnetic head 28 is connected via slip rings 32 and lead 36 to the wiper arm 91 of a manual switch 92. The tone wheel pulse train appearing at the output of the amplifier 64 is fed over lead 65 to the wiper arm 93 of a manual switch 94. Switch 94 includes a record contact 95 connected to a record timing circuit 96 over lead 97 and a play back contact 98 connected over lead 99 to a channel No. 1 play back timing circuit 102, a channel No. 2 play back timing circuit 101, and a channel No. 3 play back timing circuit 100.

Three input terminals 103, 104 and 105 are shown at the upper right hand corner of FIG. 1b. A different, continuous signal to be processed by the recording and reproducing system is fed to each of the terminals 103, 104, 105. The signals, which may be synchronous or non-synchronous, can include a series of pulses as produced in a radar or telemetry application, for example. Alternatively, one or more of the signals can include a parameter such as the amplitude which varies continuously according to the information transmitted over the signal path. The input terminals 103, 104, 105 are designated as channel Nos. 1, 2 and 3, respectively. The signal received on channel No. 1 is fed from the input terminal 103 to the record contact 106 of the manual switch 86 over an electrical path including a frequency modulator 107, lead 108, delay 109 and an amplifier 110. The signal received on channel No. 2 is fed from the input terminal 104 to the record contact 111 of the manual switch 88 over an electrical path including frequency modulator 112, lead 113, delay 114, and amplifier 115. The signal on channel No. 3 is fed from the input terminal 105 to the record contact 116 of the manual switch 90 over an electrical path including frequency modulator 117, lead 118, delay 119, and amplifier 120. By way of example, the design of the frequency modulators 107, 112 and 117 may be based on the heterodyne principle with each modulator producing a signal having approximately a 5 mc. carrier with signal sidebands of 1 to 10 mc. (deviation from approximately 4 mc. to 7 mc.). The type of frequency modulation used can be determined according to the needs of the particular application based on the present state of the art.

The frequency modulated signal appearing at the output of modulator 107 is also fed over lead 121 to a channel No. 1 record switch 122. The modulated signal at the output of the modulator 112 is fed to a channel No. 2 record switch 123 over lead 124, and the modulated signal at the output of the modulator 117 is fed to a channel No. 3 record switch 125 over lead 126. The record timing circuit 96 supplies timing signals to the channel No. 1 record switch 122 over lead 127, the channel No. 2 record switch 123 over lead 128, and the channel No. 3 record switch 125 over lead 129. The outputs of the record switches 122, 123, 125 are fed to a driver circuit 130 over leads 131, 132 and 133, respectively. The driver 130 combines the three signals fed thereto into a single signal which is fed to the record contact 134 of manual switch 92 over an electrical path including delay 135 and amplifier 136.

The manual switch 86 includes a play back contact 137 which is connected to a channel No. 1 play back switch 138 over an electrical path including lead 139 and an amplifier, equalizer and delay circuit 140. Manual switch 88 includes a play back contact 141 which is connected to a channel No. 2 play back switch 142 over an electrical path including lead 143 and an amplifier, equalizer and delay circuit 144, and the manual switch 90 includes a play back contact 145 which is connected to a channel No. 3 play back switch 146 over an electrical path including lead 147 and an amplifier, equalizer and delay circuit 148. Timing signals are individually fed to the play back switches 138, 142 and 146 from the play back timing circuits 102, 101 and 100 over leads 149, 150 and 151, respectively. The output of channel No. 1 play back switch 138 is fed to a driver circuit 142 over lead 153. The output of the channel No. 2 play back switch 142 is fed to a driver circuit 154 over lead 155, and the output of the channel No. 3 play back switch 146 is fed to a driver circuit 156 over lead 157.

Manual switch 92 which includes a wiper arm 91 connected to the time shared magnetic head 28 also includes a play back contact 158. The play back contact 158 is connected to a channel No. 1 time shared switch 159, a channel No. 2 time shared switch 160 and a channel No. 3 time shared switch 161 over lead 162. Timing signals are individually applied to the time shared switches 159, 160, and 161 from the play back timing circuits 102, 101 and 100 over leads 163, 164 and 165, respectively. The outputs of the time shared switches 159, 160 and 161 are fed to the driver circuits 152, 154 and 156 over leads 166, 167 and 168, respectively. Driver circuit 152 combines the input signals from the channel No. 1 play back switch 138 and the channel No. 1 time shared switch 159 and produces a single output signal which is fed to the channel No. 1 output terminal 169 over an electrical path including limiter 170, a frequency modulation demodulator 171 and output driver circuit 172. The driver circuit 154 is responsive to the signals applied thereto from the channel No. 2 play back switch 142 and the channel No. 2 time shared switch 160 to produce a single signal which is fed to the channel No. 2 output terminal 173 over an electrical path including limiter 174, a frequency modulation demodulator 175 and an output driver circuit 176. Driver circuit 156 combines the signals from the channel No. 3 play back switch 146 and from the channel No. 3 time shared switch 161 into a single signal which is fed to the channel No. 3 output terminal 177 over an electrical path including limiter 178, frequency modulation demodulator 179 and output driver 180. The type of frequency demodulation employed in demodulators 171, 175 and 179 is dependent upon the type of frequency modulation used in the record path. The demodulators 171, 175 and 179 may typically be of the type in which the limited frequency modulated signal is delayed and compared with the undelayed input signal. A pulse-width modulated signal is produced which is fed to a low-pass filter for extracting the signal message content from the pulse-width modulated carrier.

Since a frequency modulation recording system is provided, the switching by the play back switches 138, 142, and 146, as described more fully below, tends to produce transients in the reproduced signals after demodulation due to random phase relationships introduced in the signals at the time of switching. In applications where the presence of such transients is objectionable, squelch control signals supplied by the play back timing circuits 102, 101 and 100 are fed to the output drivers 172, 176 and 180 over leads 181, 182 and 183, respectively. The output drivers 172, 176 and 180 are responsive to the squelch control signals to reduce the level of the transients to an acceptable level, for example, the noise level of the reproduced signals.

Figure 7:
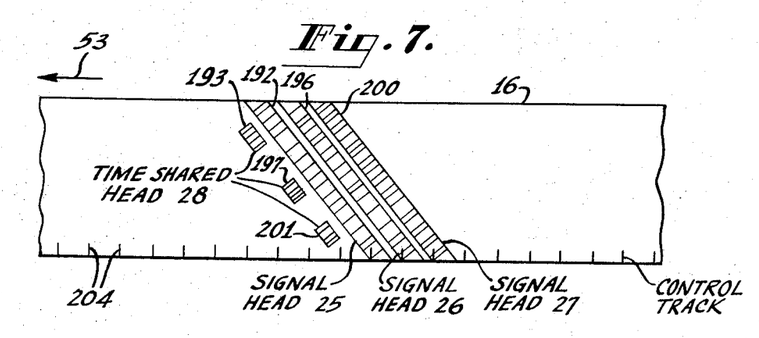
FIG. 7 is a view of a section of the magnetic tape as used in the embodiment of FIG. 1 with a representation of the record tracks placed thereon.

The operation of the helical scan recording and reproducing system will now be described with the assistance of the timing diagram shown in FIG. 8. Reference will also be made to FIG. 7 which shows a section of the magnetic tape 16 with a representation of the record tracks placed thereon.

Record mode operation

In the record mode, power is applied to the supply reel motor 14, the head wheel motor 29, the capstan motor 52 and the take-up reel motor 60. The manual switches 70, 76, 86, 88, 90, 92 and 94 are in the condition indicated in FIG. 1 with respective wiper arms in contact with the record contacts marked R. Wiper arm 69 of switch 70 engages contact 67, wiper arm 78 of switch 76 engages contact 77, wiper arm 85 of switch 86 engages contact 106, wiper arm 87 of switch 88 engages contact 111, wiper arm 89 of switch 90 engages contact 116, wiper arm 91 of switch 92 engages contact 134, and wiper arm 93 of switch 94 engages contact 95. The wiper arms of the various manual switches are preferably ganged together by a suitable mechanical connection, not shown, to provide simultaneous operation of the switches. By way of example, the wiper arms shown in FIG. 1 may take the form of armatures stacked on one or more electromagnetic relay devices.

The tape 16 is pulled by the capstan 50 to, around and away from the mandrel 17. The head wheel 24 is rotated by the head wheel motor 29. First one and then another of the magnetic heads 25, 26, 27 and 28 scans diagonally across the tape 16. Reference was made above to the helix angle of 4 degrees and 36 minutes between the plane through which the head wheel 24 rotates and the edge of the tape 16. Because of the speed imparted to the tape 16 by the capstan 50, each of the magnetic heads 25, 26, 27 and 28 scans across the tape 16 at a somewhat smaller angle, for example, 4 degrees and 30 minutes. The magnetic heads 25, 26, 27 and 28 scan successive, parallel tracks extending at the same angle diagonally across the tape 16.

The tone wheel pulses produced by the tone wheel 62 and pick-up means 63 are fed through amplifier 64 to the head wheel servo 66. A reference signal may be crystal controlled is also fed to the head wheel servo 66 via contact 77 and wiper arm 78 of manual switch 76. The head wheel servo 66 includes an arrangement for comparing the frequency and phase of the tone wheel pulses with the frequency and phase of the reference signal. An error signal is produced which is fed to the head wheel motor 29 over lead 44 to maintain the speed of the head wheel motor 29 and, therefore, the head wheel 24 constant. The tone wheel pulse train appearing at the output of amplifier 64 is also fed to the record timing circuit 96 over the electrical path including lead 65, wiper arm 93 and contact 95 of manual switch 94. A further electrical path is completed for the tone wheel pulse train from the output of amplifier 64 to the control magnetic head 71 including contact 67 and wiper arm 69 of manual switch 70 and amplifier 73. The tone wheel pulse train is recorded on a longitudinal track extending along the edge of the tape 16.

The signal to be processed in channel No. 1 of the recording and reproducing system is fed to the signal magnetic head 25 over the electrical path including input terminal 103, modulator 107, lead 108, delay 109, amplifier 110, record contact 106 and wiper arm 85 of manual switch 86, lead 33 and slip rings 32. Magnetic head 25 records the signal on first one and then another diagonal track as it completes successive scans across the tape 16. In doing so, the head 25 upon completing each scan across a diagonal track crosses the abutting edges of tape 16 to begin the next scan.

Figure 8:
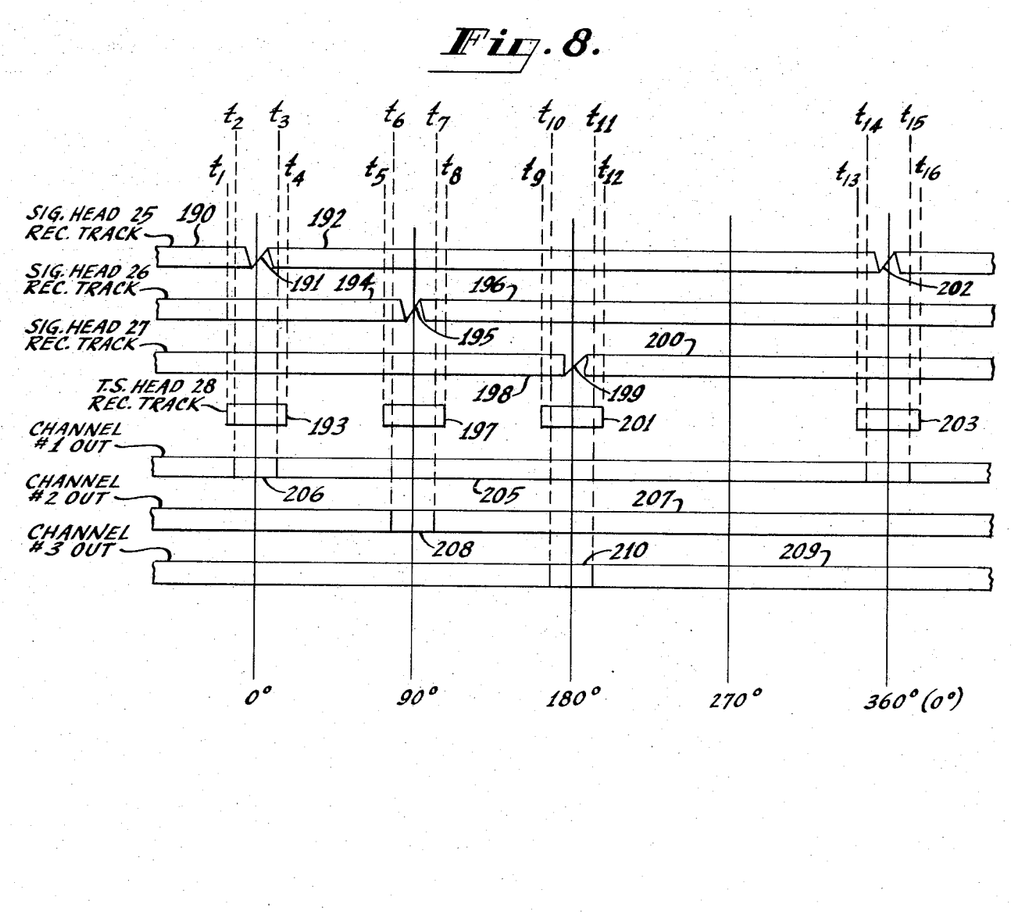
FIG. 8 is a timing diagram useful in describing the operation of the embodiment given in FIG. 1.

FIG. 8 is a timing diagram showing the switching action which takes place during a complete cycle of the rotating head wheel 24. It is assumed that the magnetic head 25 is completing a record track. At 0° (degrees) in the rotation of the head wheel 24, the magnetic head 25 crosses the abutting tape edges represented by the break 191 and starts to scan a new record track 192. Since a tone wheel pulse is produced at a fixed point in each revolution of the head wheel 24, for example, when the magnetic head 25 begins a new scan across the tape 16, the tone wheel pulse train applied to the record timing circuit 96 includes information as to the position of the magnetic head 25, as well as magnetic heads 26, 27 and 28, during each rotation of the head wheel 24. The record timing circuit 96, which may include a plurality of multivibrator circuits arranged in a counter, is responsive to the tone wheel pulse train to apply a timing signal to the channel No. 1 record switch 122 over lead 127. At the time $t_1$ before the break 191 occurs due to the edge crossover of the magnetic head 25, the channel No. 1 record switch 122 is operated by the timing signal to pass the modulated signal appearing at the output of modulator 107 to the driver circuit 130. At time $t_4$ occurring after the break 191 and when the magnetic head 25 is completing the next scan 192, the channel No. 1 record switch 122 is opened, terminating the passage of a signal therethrough from the output of the modulator 107. The resulting signal interval is fed to the time shared magnetic head 28 over the electrical path including delay 135, amplifier 136, record contact 134 and wiper arm 91 of manual switch 90, lead 36 and slip rings 32.

At the time magnetic head 25 undergoes the edge crossover resulting in the break 191, the time shared magnetic head 28 spaced 90° ahead of the magnetic head 25 will be substantially one-quarter of the way across the tape 16 and in recording contact with the tape 16. The time shared magnetic head 28 is operated between the times $t_1$ and $t_4$ to record the signal interval fed thereto on the record track section 193 shown in FIG. 8. In this manner, the signal fed to input terminal 103, channel No. 1, is continuously fed to and recorded by the magnetic head 25. The signal interval occurring during the period in which the magnetic head 25 passes from one edge of the tape 16 to the other is recorded by the magnetic head 28 as the magnetic head 28 completes that portion of its scan occurring during the edge crossover of the magnetic head 25.

The operation of the helical scan system in recording the signals on channels No. 2 and 3 is similar. The signal on channel No. 2 is continuously fed from the input terminal 104 to the magnetic head 26 over the signal processing path described above. As the head wheel 24 completes 90° of rotation, as shown in FIG. 8, the magnetic head 26 completes one record track 194, undergoes the edge crossover at break 195, and begins a new record track 196. The channel No. 2 record switch 123 is responsive to timing signals fed thereto from the record timing circuit 96 over lead 128 to pass the signal appearing at the output of modulator 112 to the time shared magnetic head 28 between the time $t_5$ and $t_8$. The time shared magnetic head 28 which now has completed approximately one-half of its scan across the tape 16 begins to record the signal appearing at the output of modulator 112 at time $t_5$ before the break 195 due to the edge crossover of the magnetic head 26. The channel No. 2 record switch 123 is opened at time $t_8$, terminating the signal interval recorded by the time shared magnetic head 28. By this action, the magnetic head 28 places the record track section 197 shown in FIG. 8 on the tape 16. The interval in the signal fed to the magnetic head 26 occurring during the period in which the magnetic head 26 passes from one tape edge to the other is recorded by the time shared magnetic head 28 on the record track section 197 spaced from the record track section 193.

The signal on channel No. 3 is continuously fed from the input terminal 105 to the magnetic head 27 on the head wheel 24 over the electrical path described above. When the head wheel 24 completes approximately 180° of rotation, the magnetic head 27 completes its scan across one record track 198, undergoes the edge crossover resulting in the break 199, and begins to scan across a new record track 200. The channel No. 3 record switch 125 is responsive to timing signals fed thereto from the record timing circuit 96 over lead 129 to pass the signal appearing at the output of the modulator 117 to the time shared magnetic head 28 between the times $t_9$ and $t_{12}$. The time shared magnetic head 28 has at this time completed approximately three-quarters of its scan across the tape 16. The interval in the signal applied to the magnetic head 27 occurring during the time that the magnetic head 27 passes from one tape edge to the other is recorded by the time shared magnetic head 28 on the record track section 201 spaced from the record track section 197.

When the head wheel 24 has completed 270° of rotation, the time shared magnetic head 28 passes from one tape edge to begin a new scan across the tape. The three magnetic heads 25, 26 and 27 to which signals are continuously applied are all in recording contact with the tape 16. As shown in FIG. 8, the magnetic head 25 is completing the record track 192, the magnetic head 26 is completing the record track 196, and the magnetic head 27 is completing the record track 200. The record switches 122, 123 and 125 all remain open, and no signal is fed to the time shared magnetic head 28. Upon the head wheel 24 completing 360° or a full rotation, the magnetic head 25 against passes from one tape edge to the other resulting in the break 202. The channel No. 1 switch 122 is closed to pass the signal appearing at the output of modulator 107 between the times $t_{13}$ and $t_{16}$ to the time shared magnetic head 28. Magnetic head 28, which has completed one-quarter of its next scan across the tape 16, records the signal interval fed thereto on the record track section 203. The operation continues in the manner described above.

The three signals fed to input terminals 103, 104, and 105 are continuously recorded by the three magnetic heads 25, 26 and 27, respectively. The fourth magnetic head 28 is time shared between the three signals. As each of the magnetic heads 25, 26 and 27 in turn passes from one tape edge to the other, the signal applied to the magnetic head during that period is also fed to the time shared magnetic head 28. Each complete rotation of the head wheel results in a separate record track being placed on the tape 16 by the magnetic heads 25, 26 and 27 with the time shared magnetic head 28 recording an additional track including intervals of each of the signals fed to the magnetic heads 25, 26 and 27.

FIG. 7 is a view of a section of the magnetic tape 16 with a representation of the record tracks placed thereon during the rotation of the head wheel 24 described above with the aid of the timing diagram given in FIG. 8. The magnetic heads 25, 26, 27 and 28 all scan from the top to the bottom of the tape 16 with the tape 16 travelling in the direction of the arrow 53. Based on the equipment parameters given by way of example the record tracks are approximately 25 inches long with a guard band or spacing between the record tracks of 2.7 mils. At the time magnetic head 25 is beginning its scan across the record track 192 shown in FIG. 8, the time shared magnetic head 28 has completed approximately one-quarter of its scan. The record track section 193, also shown in FIG. 8, produced as the magnetic head 25 undergoes tape edge crossover is placed at approximately one-quarter the length of the track scanned by the magnetic head 28. The time shared magnetic head 28 will have completed approximately one-half of its scan at the time the next magnetic head 26 undergoes edge crossover and begins the record track 196. The record track section 197 produced during the period in which the magnetic head 26 undergoes edge crossover is placed at approximately one-half the length of the track scanned by the magnetic head 28. When the magnetic head 27 begins to scan the record track 200, the time shared magnetic head 28 will have completed approximately three-quarters of its scan. The record track section 201 produced during the edge crossover of the magnetic head 27 is placed at approximately three-quarters the length of the track scanned by the time shared magnetic head 28. The four magnetic heads 25, 26, 27 and 28 on the head wheel 24 continue to record additional, successive parallel tracks exactly in the manner shown in FIG. 7. Three continuous tracks and one time shared track are recorded on the tape 16 for each full rotation of the head wheel 24. The pulse train 204 recorded by the control magnetic head 71 is shown as extending along the bottom edge of the tape 16.

In implementing the circuitry just described for recording the plurality of signal channels on the tape 16, the record switches 122, 123 and 125 may be any suitable device capable of electronically and selectively completing an electrical path between the output of the modulators 107, 112, 117 and the driver circuit 130. An alternating current transistor switch or a crystal diode gate can be used to perform the switching with the record timing circuit 96 supplying the appropriate switching bias to the devices.

The delays 109, 114, 119 and 135 in the record paths are adjustable delay lines used with the similar delays 140, 144, 148 and 186 in the play back paths to provide electronic compensation for the head quadrature variation that can exist between two head wheel assemblies. It is difficult to produce head wheel assemblies in which the magnetic heads are spaced exactly 90° apart. The delays 109, 114, 119 and 135 in the record paths are set to provide a given compensation with the delays 140, 144, 148 and 186 in the play back paths providing equal but opposite compensation. Perfect head spacing is in this manner electronically simulated, making it possible to play back a tape prepared on one head wheel assembly with a second head wheel assembly on the same or a similar recorder-reproducer. A tape can be played back by a head wheel assembly in which the magnetic head spacing is not precisely the same as the spacing of the magnetic heads on the head wheel assembly used to record, the delays simulating perfect head spacing on the head wheel assemblies.

*Reproduce mode operation*

In the reproduce or play back mode, the tape 16 upon which the three signal channels have been recorded is pulled over a path similar to that shown in FIG. 1a. Capstan 50 operates to move the tape 16 over the mandrel 17 between the supply reel 11 and take-up reel 57. The manual switches 70, 76, 86, 88, 90, 92 and 94 are all operated to engage the play back contacts indicated as PB. Wiper arm 69 of manual switch 70 engages play back contact 68, wiper arm 78 of manual switch 76 engages play back contact 75, wiper arm 85 of manual switch 86 engages play back control 137, wiper arm 87 of manual switch 88 engages play back contact 141, wiper arm 89 of manual switch 90 engages play back contact 145, wiper arm 91 of manual switch 92 engages play back contact 158, and wiper arm 93 of manual switch 94 engages play back contact 98.

The control magnetic head 71 reproduces the pulse train recorded along the edge of the tape 16. The reproduced pulse train is fed to the head wheel servo 66 over the electrical path including lead 74, amplifier 73, play back contact 75 and wiper arm 78 of the switch 76. The tone wheel pulse train produced by the tone wheel 62 and pick-up means 63 is also fed to the head wheel servo 66 via amplifier 64. The head wheel servo 66 compares the frequency and phase of the tone wheel pulses with the frequency and phase of the reproduced pulse train, producing a control signal determined by the error therebetween. The control signal is fed to the head wheel motor 29 over lead 44 to maintain the speed and timing of the head wheel 24 the same as existed during recording. The tone wheel pulses are also fed to the play back timing circuits 99, 101, and 102 via lead 65, wiper arm 93 and play back contact 98 of manual switch 94.

The magnetic heads 25, 26, 27 and 28 on the head wheel 24 are aligned with the record tracks on the tape 16 by the operation of the head wheel servo 66 and the capstan 50 so that each of the magnetic heads scans the record tracks which it placed on the tape. The signal reproduced by the magnetic head 25 is fed to the channel No. 1 play back switch 138 over the electrical path including slip rings 32, lead 33, wiper arm 85 and play back contact 137 of manual switch 86, lead 139 and the amplifier, equalizer and delay circuit 140. The circuit 140, as well as the similar circuits 144, 148 and 186 in the play back paths of the magnetic heads 26, 27, and 28, respectively, serves to provide a linearly peaked FM signal response and the compensating delay for head quadrature variation mentioned above.

Referring to the timing diagram shown in FIG. 8, it will be assumed that the magnetic head 25 is reproducing the signal recorded on the record track 190 and that the magnetic head 25 is about to pass over the tape edges to begin its scan across the next record track 192. A signal is at this time being reproduced from the record track section 193 by the time shared magnetic head 28. The signal reproduced by the time shared magnetic head 28 is fed to the channel No. 1 time shared switch 159 over the electrical path including slip rings 32, lead 36, wiper arm 91 and play back contact 153 of the manual switch 92, the amplifier, equalizer and delay circuit 186, and lead 162. The channel No. 1 play back switch 138 normally passes the signal fed thereto from magnetic head 25 to the driver circuit 152. The playback switch 138 is responsive to timing signals fed thereto from the channel No. 1 play back timing circuit 102 over lead 149 to switch-out or blank the signal received from the magnetic head 25 for the time interval $t_2$ to $t_3$. At the same time, the channel No. 1 time shared switch 159 is operated in response to timing signals applied thereto from the channel No. 1 play back timing circuit 102 over lead 163 to pass to the driver circuit 152 the portion of the signal reproduced by the time shared magnetic head 28 occurring during the time interval $t_2$ to $t_3$.

As a result of this switching action, a continuous signal 205 (represented as a stripe) appears at the output of the driver circuit 152 formed in the manner shown in FIG. 8. Up until the time $t_2$, the signal is derived from the magnetic head 25. For the interval 206 between times $t_2$ and $t_3$, the signal is derived from the time shared magnetic head 28. After time $t_3$, the signal is again derived from the magnetic head 25. Since that portion of the signal reproduced by the magnetic head 25 during edge crossover is blanked out, no deterioration of the reproduced signal due to the magnetic head 25 sensing the discontinuity in the tape surface takes place. No loss of signal occurs by deriving the signal from the time shared head 28 during the blanked period of the signal derived from the signal magnetic head 25.

As the magnetic head 25 completes successive scans across the tape 16, the portion of the signal occurring during each period in which the magnetic head 25 passes from one tape edge to the other is supplied by the time shared magnetic head 28. The driver circuit 152 combines the signal intervals derived from the time shared magnetic head 28 with the signal derived from the magnetic head 25 to form the signal 205 shown in FIG. 8. The limiter 170 which can include a plurality of stages of diode limiting removes any amplitude modulation components of the frequency modulated signal and amplifies the zero crossings of the carrier. The signal is demodulated by the frequency demodulator 171 and fed to the output terminal 169 via the output driver 172. A continuous signal corresponding to that originally fed to the input terminal 103 appears at the output terminal 169. The signal is reproduced at the output terminal 169 without any deterioration or loss of signal due to the operation of the helical scanner.

The operation of the other signal magnetic heads 26 and 27 in reproducing the signals on the second and third channels is similar. The signal reproduced by the magnetic head 26 is fed to the channel No. 2 play back switch 142 over the electrical path including lead 34 and lead 143. The play back switch 142 normally passes the received signal to the driver circuit 154. During the period in which the magnetic head 26 is passing from one tape edge to the other to begin a new scan, the play back switch 142 is responsive to timing signals received from the channel No. 2 play back timing circuit 101 over lead 150 to switch-out or blank the signal. In the sequence shown in FIG. 8, the signal is blanked for the time interval $t_6$ to $t_7$. The time shared magnetic head 28 is at this time reproducing the signal interval recorded on the track section 197. The signal derived from the time shared magnetic head 28 is fed to the channel No. 2 time shared switch 160 over the electrical path described. The time shared switch 160 is responsive to timing signals received from the channel No. 2 play back timing circuit 101 over lead 164 to pass to the driver circuit 154 the signal reproduced by the time shared magnetic head 28 during the time period $t_6$ to $t_7$.

The signal 207 shown in FIG. 8 appears at the output of the driver circuit 154. The signal is derived from the magnetic head 26 up until the time $t_6$. For the interval 208 between times $t_6$ and $t_7$, the signal is derived from the time shared magnetic head 28. After the time $t_7$, the signal is again derived from the magnetic head 26. The operation is the same for successive rotations of the head wheel 24. The reproduced signal is limited by the limiter 174, demodulated by the frequency demodulator 175 and fed to the channel No. 2 output terminal 173 through the output driver 176. A continuous signal corresponding to that originally fed to the channel No. 2 input terminal 104 appears at the output terminal 173. Since each signal period during which the magnetic head 26 passes from one tape edge to the other is derived from the time shared magnetic head 28, no deterioration or loss of signal takes place during these periods in the reproduced signal.

The signal reproduced by the third signal magnetic head 27 is fed to the channel No. 3 play back switch 146 over the electrical path including lead 35 and lead 147. The play back switch 146 normally passes the reproduced signal to the driver circuit 156. Again referring to the timing sequence shown in FIG. 8, the play back switch 146 is responsive to timing signals applied thereto from the channel No. 3 play back timing circuit 100 over lead 151 to switch-out or blank the received reproduced signal during the time interval $t_{10}$ to $t_{11}$. That portion of the signal reproduced during the period in which the magnetic head 27 completes the tape edge crossover is removed. The time shared magnetic head 28 is at this time reproducing the signal interval recorded on the track section 201. The signal reproduced by the time shared magnetic head 28 is fed to the channel No. 3 time shared switch 161 over the electrical path including leads 36 and 162. The time shared switch 161 is responsive to timing signals received from the channel No. 3 play back timing circuit 100 over lead 165 to pass the signal reproduced by the time shared magnetic head 28 to the driver circuit 156 during the time interval $t_{10}$ to $t_{11}$.

As shown in FIG. 8, the signal 209 appearing at the output of the driver circuit 156 is derived from the signal magnetic head 27 until the time $t_{10}$. For the signal interval 210 from the time $t_{10}$ to $t_{11}$, the signal is derived from the time shared magnetic head 28. At the time $t_{11}$, the signal is again derived from the signal magnetic head 27. During each successive rotation of the head wheel 24, the portion of the signal occurring as the magnetic head 27 passes from one tape edge to the other is derived from the time shared magnetic head 28. The reproduced signal is limited by the limiter 178, demodulated by the frequency demodulator 179, and fed to the channel No. 3 output terminal 177 through the output driver 180. A continuous signal corresponding to that originally fed to the channel No. 3 input terminal 105 appears at the output terminal 177. As in the case of the reproduced signals appearing at the channel No. 1 output terminal 169 and the channel No. 2 output terminal 173, no deterioration or loss of signal takes place in the reproduced signal at the channel No. 3 output terminal 177 due to the operation of the helical scanner.

The switching of the frequency modulated signals introduces random phase relationships in the reproduced signals at the switching times. Since the frequency demodulators 171, 175 and 179 are responsive to variations in frequency and phase, the random phase relationships are translated into transients introduced in the reproduced signals at the outputs of the demodulators 171, 175, and 179. Although such transients are of short duration, they can be objectionable in some applications. The output drivers 172, 176 and 180 are supplied with squelch control signals from the play back timing circuits 102, 101 and 100 over leads 181, 182 and 183, respectively. The output drivers 172, 176 and 180 include a diode limiting or similar circuit biased by the squelch control signals received at the time of the transients in the reproduced signals to reduce the level of the transients to an acceptable level. The level of the transients can be reduced to a level, for example, at or near the noise level so that little or no loss of signal occurs.

The use of a control track recorded along one edge of the tape 16 has been mentioned. Since the portions of the signals reproduced by the signal magnetic heads 25, 26 and 27 on the head wheel 24 as the heads complete the tape edge crossovers are blanked out, no distortion is introduced in the reproduced signals by the presence on the tape 16 of the control track.

The play back switches 138, 142, 146 and the time shared switches 159, 160, 161 can be of a design similar to that of the record switches 122, 123, 125. An alternating current transistor gate or similar circuit can be used to perform the switching operation described. The play back timing circuits 100, 101 and 102 can include a series of delay multivibrators arranged to count down from the time of the received tone wheel pulses to produce the necessary timing signals. Any suitable counter or similar circuit arrangement capable of producing a plurality of timed output signals in response to a pulse input may be employed. The play back switches 138, 142 and 146, the time shared switches 159, 160 and 161, and the play back timing circuits 100, 101 and 102 constitute, in effect, a 4 x 3 switch. The invention is not limited to use in applications where the particular switching arrangement shown in FIG. 1 is employed. Any switch may be used which is capable of producing three continuous signals from the four reproduced signals in the manner described.

The capstan motor 52 is shown in FIG. 1 and has been described as controlled from a reference signal supplied by the reference generator 54. Where a more precise control is desired, a capstan servo can be added. Such a servo loop can be arranged much like the head wheel servo 66. By way of example, the capstan servo can consist of three loops. A velocity loop senses the capstan speed by comparing the period of a capstan tachometer pulse against a stable delay within the capstan servo. This velocity loop controls the speed to within approximately one-half percent. A second loop compares the tone wheel pulses with the capstan tachometer pulses in the record mode, and locks the two in phase, thus assuring speed stability equal to that of the reference provided by the reference generator 54. In the play back mode, the tone wheel pulses are compared with the reproduced control track pulse train to achieve proper tracking of the magnetic heads on the head wheel. A third loop senses a long term phase error and adjusts the delay of the velocity loop. This has the effect of increasing the low frequency gain of the servo, and increasing the pull-in range. The output of the servo would be used to drive the capstan 52 through the motor control 56.

While not shown in FIG. 1 in order to simplify the drawing, additional magnetic heads can be positioned to record longitudinal tracks along the edges of the tape 16. The magnetic heads can be designed to record and reproduce voice or various types of control signals on the tape 16.

A multichannel helical scan recording and reproducing system is provided by the invention by which it is possible to record and reproduce a plurality of continuous signals which are either synchronous or non-synchronous. By providing an additional record track time shared between the signals, any distortion which would otherwise be introduced in the reproduced signals is avoided.

Figure 5:
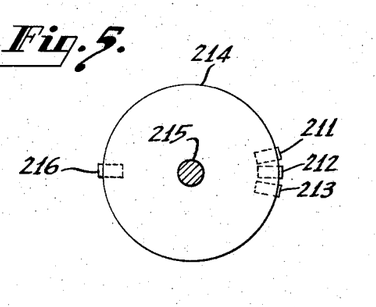
FIG. 5 is a side view and FIG. 6 is an end view of another example of a magnetic head wheel which is suitable for use in the embodiment of the invention shown in FIG. 1.
Figure 6:
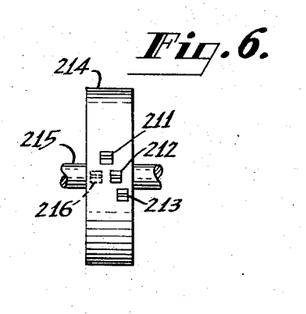

In describing the embodiment of the invention shown in FIG. 1, it has been assumed that a magnetic head wheel as shown in FIGS. 3 and 4 is employed with the magnetic heads being spaced 90° apart about the head wheel. A further example of a head wheel that can be used is shown in FIGS. 5 and 6, where FIG. 6 is a view taken in the direction of the arrows in FIG. 5. Three signal magnetic heads 211, 212 and 213 are mounted close together on the periphery of the head wheel 214. The wheel 214 is rotated by a shaft 215. The fourth, time shared magnetic head 216 is mounted approximately 180° from the center signal magnetic head 212. The four magnetic heads 211, 212, 213 and 216 are offset so that they rotate through different fixed planes. The magnetic heads 211, 212, 213, and 216 will scan over different tracks on the tape with the time shared head 216 being in contact with the tape during the periods in which the signal magnetic heads 211, 212 and 213 undergo the tape edge crossover. As can be seen from the example given in FIGS. 5 and 6, it is not necessary that the four magnetic heads in the head wheel be spaced 90° apart or that they be spaced evenly apart. The magnetic heads can be positioned about the head wheel according to the needs of the particular application with each magnetic head arranged to scan over a track spaced from that scanned by the preceding magnetic head. In the embodiment of a head wheel shown in FIGS. 5 and 6, it is evident that no signal will be fed to the time shared magnetic head 216 during most of its rotation. This recording time which is not needed in time sharing the signals fed to the magnetic heads 211, 212 and 213 can be used to record sync signals or other control information that might be needed in a given application.

Also, while an embodiment of the invention has been described for processing three signal channels, the invention may be used in the recording and reproduction of a larger number of channels. As shown in FIG. 7 in the representation of the track recorded by the time shared magnetic head 28, time periods exist between the record track sections 193, 197 and 201 during which no signal is recorded by the magnetic head 28. Instead of only the three magnetic heads 25, 26 and 27 to accommodate three separate signal channels, six magnetic heads accommodating six separate signal channels may be spaced about the head wheel with the magnetic head 28 being time shared between the six signals. Intervals of the signals fed to the three additional magnetic heads will be recorded by the time shared head 28 between the record track sections 193, 197, 201 shown in FIG. 7. The angle of scan for each magnetic head across the tape is determined so that each revolution of the head wheel results in six continuous signal record tracks and a seventh time shared record track being placed on the tape. The timing of the record and play back switches is modified to allow for the additional signal channels with the operation being the same as described above. If four or five signal channels are to be processed, a corresponding number of magnetic heads are positioned on the head wheel. By determining the parameters of the recording system, a desired number of signal channels can be recorded and reproduced. In each case, a number of magnetic heads are provided on the head wheel equal to the number of signal channels to be processed plus an additional magnetic head which is time shared between the signal channels. Where $n$ is defined as the number of signal channels, $n+1$ magnetic heads are positioned about the head wheel.

In the embodiment of the invention shown in FIG. 1, the tape describes a complete loop over the helical path with the edges of the tape abutting as the tape enters and leaves the helical path. The invention is readily adaptable for use in applications where the tape edges do not abut but are spaced some distance apart. The tape may be wrapped in a 360° helix with an open space between adjacent edges of the tape. Alternatively, a tape helix of less than 360° may be formed so that a magnetic head leaves one edge of the tape, transverses the angle necessary to complete a full rotation, and then again contacts the tape to begin a new scan. In such applications, the portion of a continuous signal fed to a signal magnetic head during the period in which it passes from one tape edge to the other is lost with respect to the operation of that magnetic head. In a multichannel recording system, regularly spaced gaps would be introduced in each signal processed by the system.

By using a system, for example, similar to that of FIG. 1, the timing of the record and play back switches is set so that the portion of a signal occurring during the period in which a signal magnetic head passes from the one tape edge to the other is recorded by the time shared magnetic head. By using an additional record track time shared between a plurality of continuous signals, a multichannel helical scan recorder-reproducer is provided which can employ either a closed loop or an open loop tape helix. Regardless of whether these two techniques are used, no loss of signal occurs. The portion of each signal which would otherwise be lost is derived from the time shared record track, resulting in the faithful recording and reproduction of the signals.

I claim:

1. In a system for recording electrical signals including a plurality of recording devices, means moving said devices in a circular path about a predetermined axis, means moving a record medium along a path oblique to said axis and in a helical path around the circular path of movement of said devices with each of said devices scanning over a different succession of tracks extending diagonally across said medium,
   said system comprising, in combination,
   means to continuously apply a plurality of signals to all but one of said devices with a different signal being applied individually to each device,
   means to produce a further signal composed of regularly occurring intervals of each of said plurality of signals,
   and means to apply said further signal to said one device.

2. In combination,
   a plurality of recording devices,
   means moving said devices in a circular path about a predetermined axis,
   means moving a record medium along a path oblique to said axis and in a helical path around the circular path of movement of said devices with each of said devices scanning over a different succession of tracks extending diagonally across said medium,
   means to continuously apply a plurality of signals to all but one of said devices with a different signal being applied individually to each device,
   means to produce a further signal composed of regularly occurring, non-overlapping intervals of each of said plurality of signals,
   and means to apply said further signal to said one device.

3. A helical scan recorder for recording a plurality of signals on a record medium comprising, in combination,
   means to record said plurality of signals with each of said plurality of signals being recorded on a track extending diagonally across said medium,
   and means to record a further signal composed of regularly occurring intervals of each of said plurality of signals on an additional track extending diagonally across said medium and spaced from said tracks upon which said plurality of signals are recorded.

4. A helical scan recorder-reproducer for recording a plurality of signals on and reproducing said signals from a record medium comprising, in combination,
   means to continuously record said plurality of signals with each of said signals being recorded on a succession of tracks extending diagonally across said medium,
   means to record a further signal composed of regularly occurring, non-overlapping intervals of each of said plurality of signals on an additional succession of tracks extending diagonally across said medium and spaced from said tracks upon which said plurality of signals are recorded,
   and means responsive to said recorded plurality of signals and said further recorded signal when reproduced from said medium to provide a second plurality of signals corresponding to said first-mentioned plurality of signals.

5. In a system for recording a plurality of signals including a plurality of recording devices, means moving said devices in a circular path about a predetermined axis, means moving a record medium along a path oblique to said axis and in a helical path around the circular path of movement of said devices with each of said devices scanning over a succession of tracks extending diagonally across said medium,
   said system comprising, in combination,
   means including all but one of said devices to continuously record said plurality of signals with each of said plurality of signals being recorded on a different succession of tracks extending diagonally across said medium,
   and means including said one device to record a further signal composed of regularly occurring, non-overlapping intervals of each of said plurality of signals on an additional succession of tracks upon which said plurality of signals are recorded.

6. In a recording and reproducing system including a plurality of signal recording and reproducing devices, means moving said devices in a circular path about a predetermined axis, means moving a record medium along a path oblique to said axis and in a helical path around the circular path of movement of said devices with each of said devices scanning over a succession of tracks extending diagonally across said medium,
   said system comprising, in combination,
   means including all but one of said devices to continuously record a plurality of signals with each of said plurality of signals being recorded on a different succession of tracks extending diagonally across said medium,
   means including said one device to record a further signal composed of regularly occurring, non-overlapping intervals of each of said plurality of signals on an additional succession of tracks extending diagonally across said medium and spaced from the tracks upon which said plurality of signals are recorded,
   and means responsive to said recorded plurality of signals and said further recorded signal when reproduced by said devices to produce a second plurality of signals corresponding to said first-mentioned plurality of signals.

7. In a system for reproducing a plurality of different signals recorded on a record medium with each of said plurality of signals being recorded on a succession of tracks extending diagonally across said medium, a further signal composed of regularly occurring intervals of each of said plurality of signals being recorded on an additional succession of tracks extending diagonally across said medium and spaced from said tracks upon which said plurality of signals are recorded,
   said system comprising, in combination, means for reproducing said plurality of signals and said further signal from said medium, and means to combine said reproduced further signal with said reproduced plurality of signals to form a plurality of continuous output signals.

8. In combination, a plurality of signal reproducing devices, means moving said devices in a circular path about a predetermined axis, means moving a record medium along a path oblique to said axis and in a helical path around the circular path of movement of said devices with each of said devices scanning over a succession of tracks extending diagonally across said medium, said medium having a plurality of signals recorded thereon with each of said plurality of signals being recorded on a different succession of said tracks, said medium also having a further signal composed of regularly occurring intervals of each of said plurality of signals recorded on an additional succession of said tracks separate from said tracks upon which said plurality of signals are recorded, means to operate all but one of said devices to reproduce said plurality of signals from said medium, means to operate said one device to reproduce said further signal from said medium, and means to combine said reproduced further signal with said reproduced plurality of signals to form a plurality of continuous output signals.

9. In combination, a plurality of magnetic heads, means moving said heads in a circular path about a predetermined axis, means moving a magnetic tape along a path oblique to said axis and in a helical path around the circular path of movement of said devices with each of said devices scanning over a succession of tracks extending diagonally across said tape, means to continuously apply a plurality of signals to all but one of said heads with a different signal being applied individually to each head, a switching circuit responsive to said plurality of signals to produce a further signal composed of non-overlapping intervals of each of said plurality of signals, and means to apply said further signal from said circuit to said one head.

10. In a system including a plurality of recording devices, means moving said devices in a circular path about a predetermined axis, means moving a record medium along a path oblique to said axis and in a helical path around the circular path of movement of said devices so that each of said devices passes from one edge of said medium to the other to complete successive scans diagonally across said medium, at least one of said devices being spaced from the other devices about said circular path so that said one device is in the process of completing a single scan across said medium as each of said other devices pass from one edge of said medium to the other to begin a new scan, said system comprising, in combination, means to continuously apply a plurality of signals to said other devices with a different signal being applied individually to each of said other devices, means responsive to said plurality of signals to produce a further signal composed of the intervals in said plurality of signals occurring as said other devices pass from one edge of said medium to the other, and means to apply said further signal to said one device.

11. In a system for recording electrical signals and including a plurality of recording devices, means moving said devices in a circular path about a predetermined axis, means moving a record medium along a path oblique to said axis and in a helical path around the circular path of movement of said devices, said devices being spaced about said circular path so that said devices pass in turn from one edge of said medium to the other to complete successive scans diagonally across said medium, at least one of said devices being spaced from the other devices about said circular path so that said one device is in the process of completing a single scan across said medium as each of said other devices pass from one edge of said medium to the other to begin a new scan, said system comprising, in combination, means to continuously apply a plurality of input signals to said other devices with a different signal being applied individually to each of said other devices, and means to apply to said one device the intervals in said plurality of signals occurring as said other devices pass from one edge of said medium to the other to cause said one device to be time shared between said plurality of signals with an interval of each of said plurality of signals being applied to said one device during each scan of said one device across said medium.

12. In a system for recording and reproducing electrical signals and including a plurality of recording-reproducing devices, means moving said devices in a circular path about a predetermined axis, means moving a record medium along a path oblique to said axis and in a helical path around the circular path of movement of said devices, said devices being spaced about said circular path so that said devices pass in turn from one edge of said medium to the other to complete successive scans diagonally across said medium, at least one of said devices being spaced from the other devices about said circular path so that said one device is in the process of completing a single scan across said medium as each of said other devices pass from one edge of said medium to the other to begin a new scan, said system comprising, in combination, means to continuously apply a plurality of signals to said other devices with a different signal being applied individually to each of said other devices, means to apply to said one device the intervals in said plurality of signals occurring as said other devices pass from one edge of said medium to the other to cause said one device to be time shared between said plurality of signals with an interval of each of said plurality of signals being applied to said one device during each single scan of said one device across said medium, means for deriving said plurality of signals from said other devices and said further signal from said one device upon said devices being operated to reproduce said recorded plurality of signals and said recorded further signal from said medium, and means to combine said reproduced further signal with said reproduced plurality of signals to form a plurality of continuous output signals corresponding to said plurality of input signals.

13. In a system for reproducing electrical signals recorded on a record medium and including a plurality of reproducing devices, means moving said devices in a circular path about a predetermined axis, means moving a record medium along a path oblique to said axis and in a helical path around the circular path of movement of said devices, said devices being spaced about said circular path so that said devices pass in turn from one edge of said medium to the other to complete successive scans diagonally across said medium, at least one of said devices being spaced from the other devices about said circular path so that said one device is in the process of completing a single scan across said medium as each of said other devices pass from one edge of said medium to the other to begin a new scan, said other devices each being arranged to scan a succession of record tracks extending diagonally across said medium upon which a signal is recorded with a different signal being recorded on the record tracks scanned by each of said other devices, said one device being arranged to scan an additional succession of record tracks extending diagonally across said medium upon which is recorded a further signal composed of the intervals in said different signals occurring as said other devices pass from one edge of said medium to the other, said system comprising, in combination, means for operating said other devices to reproduce said different signals and for operating said one device to reproduce said further signal from said medium, and means to combine said reproduced further signal with said reproduced different signals to form a plurality of continuous output signals each composed of one of said different signals and the intervals of that signal included in said further signal.

14. In a system including a plurality of magnetic heads, means moving said heads in a circular path about a predetermined axis, means moving a magnetic tape along a path oblique to said axis and in a helical path around the circular path of movement of said heads, said heads being spaced about said circular path and in contact with said tape so that said heads pass in turn from one edge of said medium to the other to complete successive scans diagonally across said tape, at least one of said heads being spaced from the other heads about said circular path so that said one head is in the process of completing a single scan across said tape as each of said other heads pass from one edge of said tape to the other to begin a new scan, said system comprising, in combination, means to continuously apply a plurality of signals to said other heads with a different signal being applied individually to each of said other heads, and means to apply to said one head the intervals in said plurality of signals occurring as said other heads pass from one edge of said tape to the other to cause said one head to be time shared between said plurality of signals with an interval of each of said plurality of signals being applied to said one head during each scan of said one head across said medium.

15. In a system including a first, second and third recording device, means moving said devices in a circular path about a predetermined axis, means moving a record medium along a path oblique to said axis and in a helical path around the circular path of movement of said devices, said devices being spaced about said circular path and in recording contact with said medium so that said devices pass in turn from one edge of said medium to the other to complete successive scans diagonally across said medium, said first device being spaced from said second and third devices about said circular path so that said first device is in the process of completing a single scan across said medium as said second and third devices pass in turn from one edge of said medium to the other to begin a new scan, said system comprising, in combination, means to apply a first signal to said second device and to apply a second signal to said third device, and means to apply to said first device the intervals in said first and second signals occurring as said second and third heads pass in turn from one edge of said medium to the other to cause said first device to be time shared between said first and second signals with an interval of said first and second signals being applied to said first device during each scan of said first device across said medium.

16. In combination, first, second and third recording devices, means moving said devices in a circular path about a predetermined axis, means moving a record medium along a path oblique to said axis and in a helical path around the circular path of movement of said devices, said devices being spaced about said circular path so that said devices pass in turn from one edge of said medium to the other to complete successive scans diagonally across said medium, said first device being spaced from said second and third devices about said circular path so that said first device is in the process of completing a scan across said medium as said second and third devices pass in turn from one edge of said medium to the other to begin a new scan, means to continuously apply a first signal to said second device and to continuously apply a second signal to said third device, means responsive to said first and second signals to produce a third signal composed of the intervals in said first and second signals occurring during the periods in which said second and third devices pass in turn from one edge of said medium to the other, and means to apply said third signal to said first device.

17. In combination, a disc-like member mounted for rotation in a fixed plane about a predetermined axis, first, second and third magnetic heads positioned on and spaced about the periphery of said member, motor means for rotating said member at a constant speed to move said heads in a circular path about said predetermined axis, means for moving a magnetic tape along a path oblique to said axis and in a helical path around the circular path of movement of said heads, said heads being spaced about said circular path and in recording contact with said tape so that said heads pass in turn from one edge of said medium to the other to complete successive scans diagonally across tape, said first head being spaced from said second and third heads about said circular path so that said first head is in the process of completing a scan across said tape as said second and third heads pass in turn from one edge of said tape to the other to begin a new scan, means to continuously apply a first signal to said second head and to continuously apply a second signal to said third head, and means to apply to said first head the intervals in said first and second signals occurring as said second and third heads pass in turn from one edge of said tape to the other.

18. In a helical scan recording system including a mandrel formed by a pair of cylinders disposed in spaced apart, end-to-end relation, said cylinders being coaxial and of substantially the same diameter, a rotary member mounted for rotation on the common axis of said cylinders in the space between said cylinders, motor means for rotating said member at a constant speed, a plurality of recording devices mounted on and spaced about the periphery of said member in a position to extend into the space between the adjacent ends of said cylinders and contact a record medium when wrapped around said mandrel, means for moving said medium in a helical path about said mandrel, said devices being spaced about the periphery of said member so that said devices pass in turn from one edge of said medium to the other to complete successive scans diagonally across said medium, at least one of said devices being spaced from the other devices about the periphery of said member so that said one device is in the process of completing a scan across said medium as said other devices pass in turn from one edge of said medium to the other to begin a new scan, said system comprising, in combination, means to continuously apply a plurality of signals to said other devices with a different signal being applied individually to each of said other devices, and means to apply to said one device the intervals in said plurality of signals occurring as said other devices pass in turn from one edge of said medium to the other to cause said one device to be time shared between said plurality of signals with an interval of each of said plurality of signals being applied to said one device during each scan of said one device across said medium.

19. In a helical scan recording system including a mandrel formed by a pair of cylinders disposed in spaced apart, end-to-end relation, said cylinders being coaxial and of substantially the same diameter, a rotary member mounted for rotation on the common axis of said cylinders in the space between said cylinders, motor means for rotating said member at a constant speed, a plurality of magnetic heads mounted on and spaced about the periphery of said member in a position to extend into the space between the adjacent ends of said cylinders and contact a magnetic tape when wrapped around said mandrel, means for moving a magnetic tape in a helical path about said mandrel and in contact with said heads, said heads being spaced about the periphery of said member so that said heads pass in turn from one edge of said tape to the other to complete successive scans diagonally across said tape, at least one of said heads being spaced from the other heads about the periphery of said member so that said one head is in the process of completing a single scan across said tape as said other devices pass in turn from one edge of said tape to the other to begin a new scan, said system comprising, in combination, means to continuously apply a plurality of signals to said other heads with a different signal being applied individually to each of said other heads, a switching circuit responsive to said plurality of signals to produce a further signal composed of the intervals in said plurality of signals occurring as said other heads pass in turn from one edge of said tape to the other, and means to apply said further signal to said one head, whereby said one head is time shared between said plurality of signals with an interval of each of said plurality of signals being applied to said one head during each scan of said one head across said tape.

20. In a helical scan recording system as claimed in claim 19, and including tone wheel and pick-up means operated along with said member by said motor means to produce a pulse train, said pulse train having a frequency and phase determined by the rotational speed and timing of said member, and timing means responsive to said pulse train for electronically controlling the operation of said switching circuit in producing said further signal.

21. In a system including a first and second recording device, means moving said devices in a circular path about a predetermined axis, means moving a record medium along a path oblique to said axis and in a helical path around the circular path of movement of said devices so that each of said devices passes from one edge of said medium to the other to complete successive scans diagonally across said medium, said first device being spaced from said second device about said circular path so that said first device is in the process of completing a single scan across said medium as said second device passes from one edge of said medium to the other to begin a new scan, said system comprising, in combination, means to apply a signal to said second device, means responsive to said signal to produce as a further signal substantially only the intervals in said first mentioned signal occurring as said second device passes from one edge of said medium to the other, and means to apply said further signal to said first device.

22. In a helical scan recording system including a mandrel formed by a pair of cylinders disposed in spaced apart, end-to-end relation, said cylinders being coaxial and of substantially the same diameter, a rotary member mounted for rotation on the common axis of said cylinders in the space between said cylinders, motor means for rotating said member at a constant speed, first and second recording devices mounted on and spaced about the periphery of said member in a position to extend into the space between the adjacent ends of said cylinder and contact a record medium when wrapped around said mandrel, means for moving said medium in a helical path about said mandrel, said devices being spaced about the periphery of said member so that said devices pass in turn from one edge of said medium to the other to complete successive scans diagonally across said medium, said first device being spaced from said second device about the periphery of said member so that said first device is in the process of completing a scan across said medium as said second device passes in turn from one edge of said medium to the other to begin a new scan, said system comprising, in combination, means to continuously apply a signal to said second device, and means to apply to said first device substantially only the intervals in said signal occurring as said second device passes in turn from one edge of said medium to the other to cause at least one interval of said signal to be applied to said first device during each scan of said first device across said medium.

References Cited

UNITED STATES PATENTS

| | | | |
|---|---|---|---|
| 3,152,223 | 10/1964 | Wessels | 179—100.2 |
| 3,157,738 | 11/1964 | Okamura | 178—6.6 |
| 3,239,603 | 3/1966 | Kihara | 178—6.6 |

BERNARD KONICK, *Primary Examiner.*

L. G. KURLAND, *Assistant Examiner.*